(12) United States Patent
Iyer et al.

(10) Patent No.: US 8,934,386 B2
(45) Date of Patent: Jan. 13, 2015

(54) POWER-SAVE FOR WIRELESS NETWORKS

(75) Inventors: Mahesh Iyer, Sunnyvale, CA (US);
Kapil Chhabra, Milpitas, CA (US);
Yury Gonikberg, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 914 days.

(21) Appl. No.: 12/642,253

(22) Filed: Dec. 18, 2009

(65) Prior Publication Data

US 2010/0157865 A1 Jun. 24, 2010

Related U.S. Application Data

(60) Provisional application No. 61/138,811, filed on Dec. 18, 2008, provisional application No. 61/139,474, filed on Dec. 19, 2008.

(51) Int. Cl.
*H04W 52/02* (2009.01)

(52) U.S. Cl.
CPC ...... *H04W 52/0216* (2013.01); *H04W 52/0258* (2013.01); *Y02B 60/43* (2013.01); *Y02B 60/50* (2013.01)
USPC .......................................... 370/311

(58) Field of Classification Search
CPC .............. H04W 52/00–52/0258; Y02B 60/43; Y02B 60/50
USPC .................... 370/311, 338; 455/423
See application file for complete search history.

(56) References Cited

U.S. PATENT DOCUMENTS

| | | | |
|---|---|---|---|
| 2006/0270437 A1* | 11/2006 | Ueda et al. ..................... | 455/522 |
| 2006/0285527 A1* | 12/2006 | Gao et al. ...................... | 370/338 |
| 2008/0112347 A1* | 5/2008 | Gossain et al. ............... | 370/311 |

* cited by examiner

*Primary Examiner* — Pao Sinkantarakorn
*Assistant Examiner* — Richard K Chang
(74) *Attorney, Agent, or Firm* — Sterne, Kessler, Goldstein & Fox P.L.L.C.

(57) ABSTRACT

Embodiments of the present invention enable power-save methods for wireless networks. Embodiments of the present invention are compliant with the IEEE 802.11 protocol. Further, embodiments of the present invention are readily interoperable with other third party implementations.

28 Claims, 6 Drawing Sheets

POWER-SAVE FOR WIRELESS NETWORKS

CROSS-REFERENCE TO RELATED APPLICATIONS

The present application claims the benefit of U.S. Provisional Patent Application No. 61/138,811, filed Dec. 18, 2008, and U.S. Provisional Patent Application No. 61/139,474, filed Dec. 19, 2008, both of which are incorporated herein by reference in their entireties.

BACKGROUND OF THE INVENTION

1. Field of the Invention

The present invention relates generally to power-save for wireless networks.

2. Background Art

Existing IBSS (Independent Basic Service Set) power saving implementations lack compatibility, which has thus far prevented widespread adoption of the IEEE 802.11 IBSS mode.

There is a need therefore for compatible IBSS power saving implementations that are compliant with the IEEE 802.11 protocol.

BRIEF SUMMARY

The present invention relates generally to power-save for wireless networks.

Embodiments of the present invention enable power-save methods for wireless networks. Embodiments of the present invention are compliant with the IEEE 802.11 protocol. Further, embodiments of the present invention are readily interoperable with other third party implementations.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Figure 1:
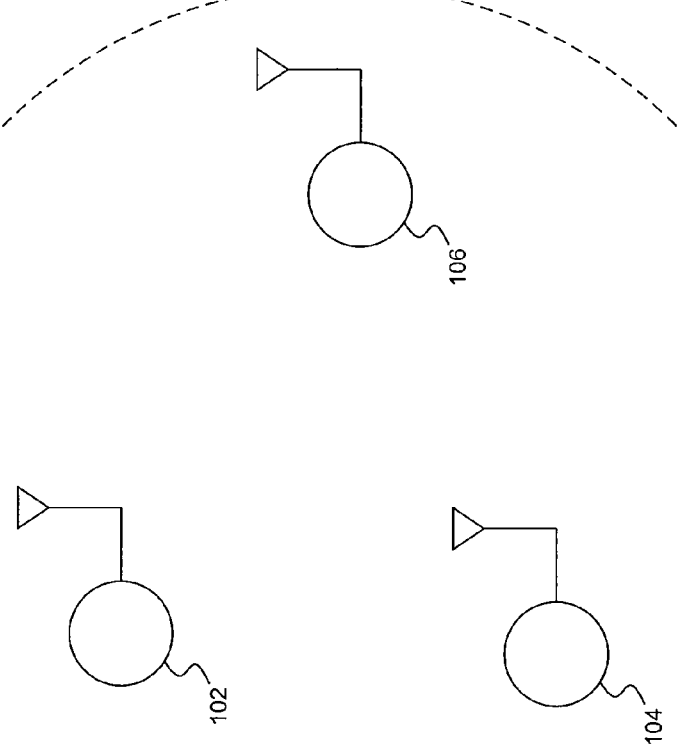
FIG. 1 is an example illustration of an Independent Basic Service Set (IBSS) network.

FIG. 1 is an example illustration of an Independent Basic Service Set (IBSS) network 100. As shown in FIG. 1, IBSS network 100 includes a plurality of nodes 102, 104, and 106. Nodes 102, 104, and 106 may include any combination of devices having wireless communication capability, including laptops, mobile phones, personal digital assistant (PDAs), etc. Further, nodes 102, 104, and 106 are all within radio communication range from one another.

Medium access in IBSS 100 is governed by channel access procedures of the IEEE 802.11 MAC protocol. In particular, IBSS 100 implements the Distributed Coordination Function (DCF) access method of the IEEE 802.11 MAC protocol. DCF provides support for asynchronous data transfer on a best-effort basis. Further, under DCF, the transmission medium operates in the contention-mode exclusively, requiring all nodes to contend for the channel for each packet transmission.

Generally, nodes in the network implement the carrier sensing multiple access with collision avoidance (CSMA-CA) protocol. CSMA-CA involves monitoring the channel to determine whether the medium is idle or busy. If the medium is busy, a node waits for a random period of time before attempting to seize the channel when the channel goes idle.

Further, under CSMA-CA, all nodes are required to remain quiet for a certain minimum period after a transmission has been completed. This period is referred to as the interframe space (IFS). The length of the IFS depends on the type of frame that the node is about to transmit. For example, high-priority frames (e.g., ACKs, CTS frames, etc.) must only wait a short IFS (SIFS) period before they contend for the channel. On the other hand, data frames must wait for the DCF interframe space (DIFS) period before they contend for the channel.

Following the interframe space period, a node with a packet to transmit may contend for the channel during a contention window. This includes randomly calculating a backoff time at the end of which the node will attempt to seize the channel. Generally, the backoff time is calculated according to a uniform probability distribution function from the range [0, CW], where CW indicates a pre-determined contention window length. When the backoff timer expires, the node will transmit its packet if the medium has remained idle since the last interframe space period. Otherwise, the backoff procedure is suspended and then resumed in a subsequent contention window.

To implement the above described channel access method, synchronization between the nodes of IBSS network 100 is required. Generally, synchronization is performed using a beaconing function, which involves broadcasting beacons at periodic beacon intervals. In an IBSS network, beaconing is a shared responsibility among nodes in the network. In other words, unlike in an access-point based network in which beaconing is the sole responsibility of the access point, each node which is part of an IBSS network will attempt to transmit a beacon at a specified time, known as the Target Beacon Transmission Time (TBTT). Generally, this is performed in a manner analogous to channel access, in that each node will calculate a random beaconing backoff time to transmit a beacon and the node with the smallest beaconing backoff time will be the one to transmit the beacon.

In addition, for purposes of network maintenance, the node transmitting the beacon during the current beacon interval is responsible for responding to probe requests from nodes attempting to join the IBSS network, until a subsequent beacon is sent by a different node. Thus, the node transmitting the beacon must remain awake until the next beacon interval and may not enter sleep or low power mode, for example.

IBSS networks may be either homogeneous (i.e., having nodes that consist of the same type of wireless devices) or heterogeneous (i.e., having nodes that consist of different types of wireless devices). In both cases, however, nodes in an IBSS network may have different energy capabilities. For example, certain nodes, such as cellular phones, for example, may be running off of small battery sources. Other nodes, such as laptops, for example, may have larger battery sources or may be coupled to an AC power source. Accordingly, the power saving requirements of nodes in an IBSS network can be dramatically different.

Existing IBSS power saving implementations lack compatibility, which has thus far prevented widespread adoption of the IEEE 802.11 IBSS mode. Embodiments of the present invention enable power-save methods for IBSS networks. Embodiments of the present invention are compliant with the IEEE 802.11 protocol. Further, embodiments of the present invention are readily inter-operable with other third party IBSS implementations. While embodiments of the present invention will be described herein with respect to IBSS networks, they are not limited to such networks. For example, and without limitation, embodiments of the present invention may also be used in BSS networks.

Power-save methods according to embodiments of the present invention will now be presented. For purposes of illustration only, embodiments of the present invention will be described with reference to example IBSS network 100 of FIG. 1. Further, for purposes of illustration only, it is assumed that node 102 in IBSS network 100 is a wireless device with a small battery source (e.g., cellular phone), implementing power-save methods according to embodiments of the present invention. Node 102 may be the creator node (i.e., the first ad-hoc node to establish the IBSS network by sending a beacon) or an ad-hoc joiner node of IBSS network 100.

Figure 2:
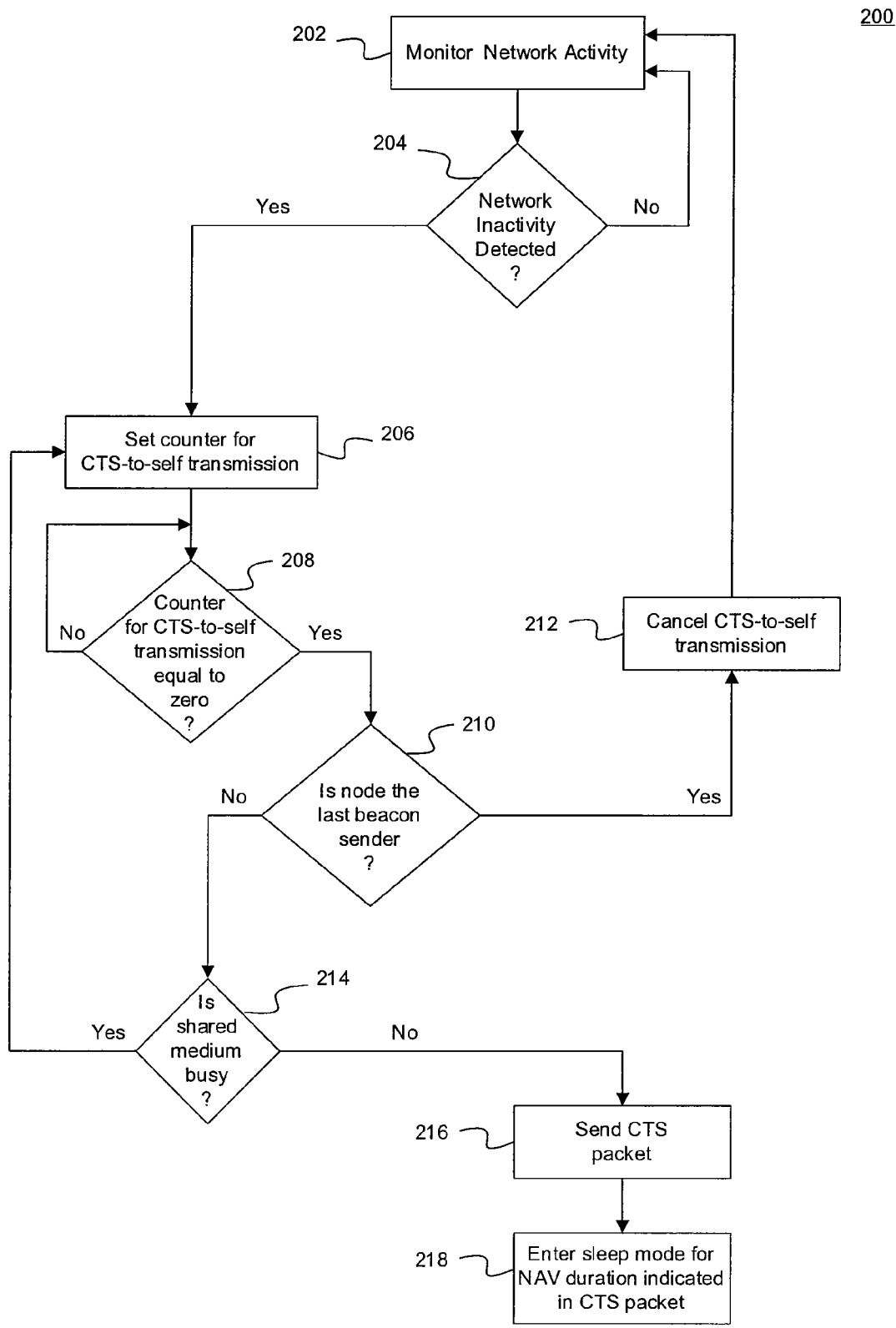
FIG. 2 is a process flowchart of a power-save method according to an embodiment of the present invention.

FIG. 2 is a process flowchart 200 of a power-save method according to an embodiment of the present invention. Process flowchart 200 will be described in part with reference to node 102 of IBSS network 100 of FIG. 1.

Process flowchart 200 begins in step 202, which includes monitoring network activity. With reference to FIG. 1, for example, node 102 may monitor all data traffic transmitted or received over the shared medium in order to measure network activity. In an embodiment, node 102 monitors network activity over N consecutive beacon periods and generates a measure of network activity over the shared medium. In an embodiment, the measure of network activity over the shared medium is represented by the number of transmitted/received packets over N consecutive beacon periods.

Step 204 includes determining whether a low level of network activity or inactivity has been detected. In an embodiment, this includes comparing the measure of network activity to a pre-defined threshold. In an embodiment, the pre-defined threshold is a statistically generated measure of typical network activity. If network activity is above the pre-defined threshold, process flowchart 200 returns to step 202. Otherwise, if network activity is below the pre-defined threshold, process flowchart 200 proceeds to step 206.

Step 206 includes setting a decreasing counter for a CTS-to-self transmission. According to an embodiment of the present invention, a CTS-to-self transmission includes transmitting a CTS (Clear to Send) packet having the sender's node address as a destination address. Further, the transmitted CTS packet will indicate in its network allocation vector (NAV) field the amount of time after the end of the CTS packet transmission that the channel will be unavailable. Generally, under DCF, the NAV field duration corresponds to the duration of time that the channel will be utilized in order to successfully complete a transmission. In the case of a CTS-to-self transmission, however, the NAV field serves to temporarily stop activity over the shared medium and to allow the sender node to enter sleep or low power mode for the NAV field duration.

In an embodiment, the counter for the CTS-to-self transmission is set randomly and according to a DCF backoff time for CTS-to-self transmissions. In another embodiment, the counter for the CTS-to-self transmission is generated according to a uniform probability distribution function from the range $[0, CW_{CTS-to-self}]$, where $CW_{CTS-to-self}$ indicates a pre-determined contention window length for CTS-to-self transmissions. According to another embodiment, the CTS-to-self transmission counter is set such that the NAV field duration would not straddle an expected TBTT.

Referring back to FIG. 2, step 208 includes determining whether the counter for the CTS-to-self transmission has reached zero. As shown in FIG. 2, process flowchart 200 includes a loop back to step 208, until the CTS-to-self counter reaches zero, at which time process flowchart proceeds to step 210.

Step 210 includes determining whether the node (i.e., the node implementing process 200) was the sender of the last beacon. If the answer is yes, process flowchart 200 proceeds to step 212, which includes canceling the scheduled CTS-to-self transmission and returning to step 202. This is because, according to the embodiment of FIG. 2, the node which transmits the last beacon may not enter sleep mode until the next beacon is transmitted for network maintenance and configuration purposes. Otherwise, process flowchart proceeds to step 214. In another embodiment, as described further below, the node may enter sleep or low power mode despite being the last beacon sender.

Step 214 includes determining whether the shared medium is busy. If yes, then process flowchart 200 returns to step 206 in order to reschedule the CTS-to-self transmission. Alternatively, process flowchart 200 may return to step 202 (not shown in FIG. 2). On the other hand, if the shared medium is idle, then process flowchart 200 proceeds to step 216, which includes transmitting the CTS packet.

Finally, in step 218, following a successful CTS-to-self transmission, the node may enter sleep or low power mode for the NAV field duration indicated in the CTS packet. In an embodiment, entering sleep or low power mode includes turning off the radio for the NAV field duration indicated in the CTS packet. In another embodiment, the radio is turned off for a duration equal to the NAV field duration minus Delta milliseconds, where Delta represents the sum of any overhead delay associated with shutting down the radio after CTS-to-self transmission. In an embodiment, the NAV field duration is set such that complete shutdown (including radio, oscillator, and PLL) is possible, in order to increase power savings. Subsequently, just prior to the end of the NAV field duration, the node will power back on its radio.

It is noted that process flowchart 200, according to an embodiment of the present invention, may be repeated one or more times during a single beacon interval. Also, as would be understood by a person skilled in the art based on the teachings herein, process flowchart 200 is not limited to transmitting a CTS packet. For example, any 802.11 frame (e.g., data packet, RTS, ACK, null frame, etc.) may be used, with the NAV field of the frame set as described above. Thus, the "CTS-to-self" term in process flowchart 200 may be generally replaced with the term "packet-to-self."

Figure 3:
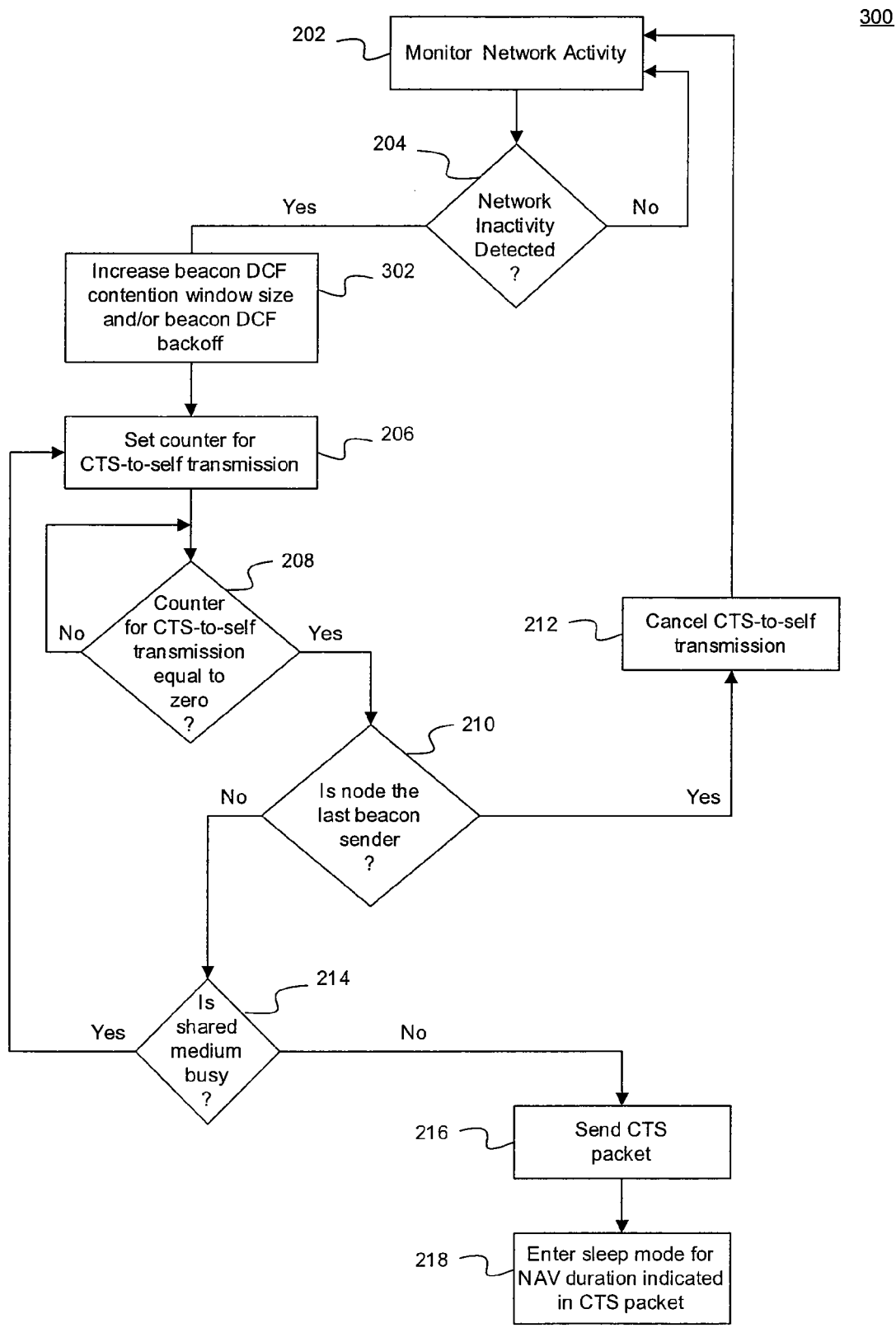
FIG. 3 is a process flowchart of a power-save method according to an embodiment of the present invention.

FIG. 3 is a process flowchart 300 of a power-save method according to an embodiment of the present invention. Process flowchart 300 includes identical steps as described above with respect to process flowchart 200. These steps are referred to using the same reference numerals as their corresponding steps in FIG. 2, and will not be described herein.

In addition, process flowchart 300 includes an added step 302, which occurs immediately before step 206. Step 302 includes increasing the beacon DCF contention window size and/or the beacon DCF backoff at the node implementing process 300. As such, step 302 will decrease the probability that the node (implementing process 300) is the beacon sender for subsequent beacon interval(s). By beaconing at a lower probability, the node will have more opportunities to complete process 300 and enter sleep or low power mode, thereby further increasing its power savings.

Figure 4:
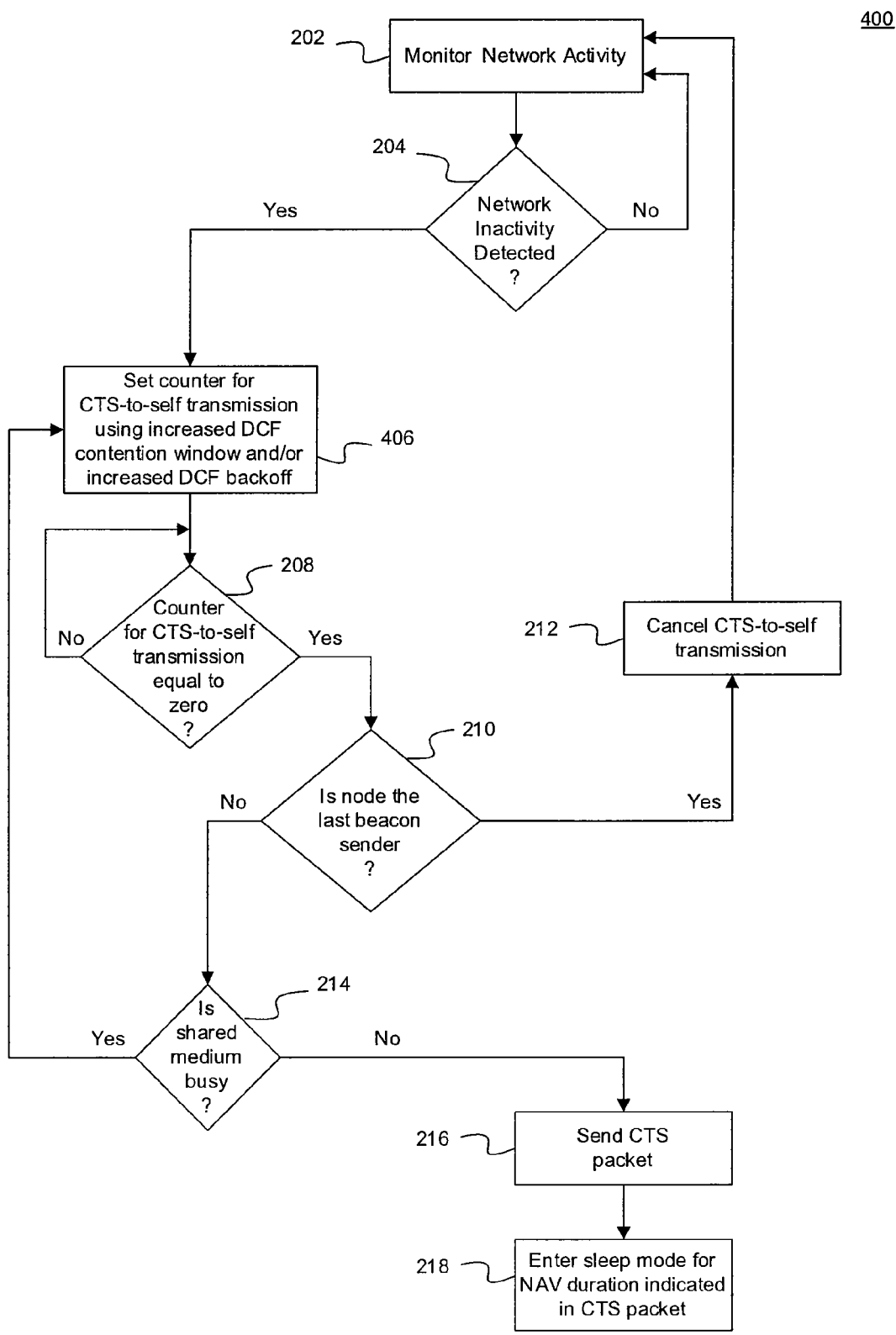
FIG. 4 is a process flowchart of a power-save method according to an embodiment of the present invention.

FIG. 4 is a process flowchart 400 of a power-save method according to an embodiment of the present invention. Process flowchart 400 includes identical steps as described above with respect to process flowchart 200. These steps are referred to using the same reference numerals as their corresponding steps in FIG. 2, and will not be described herein.

In addition, process flowchart 400 includes a modified step 206, referred to as step 406 in FIG. 4. Step 406 includes setting the counter for the CTS-to-self transmission using an increased DCF contention window and/or an increased DCF backoff. Note that what step 406 effectively does is to schedule the CTS-to-self transmission with a probabilistically higher backoff time than using step 206 of FIG. 2. This will reduce the probability that the node completes process 400 (and enters sleep or low power mode), because the probability that another node will have seized the channel by the time the CTS-to-self transmission is due to occur will be higher.

Embodiments of the present invention according to process 400 may be used in order to prevent the node implementing the power-save method from repeatedly jamming the shared medium with CTS-to-self transmission. Thus, the node implementing the power-save method will exhibit higher awareness to network activity. Determining whether or not modified step 406 should be used will depend, for example, on statistical network activity levels. For example, in an embodiment, modified step 406 will be used during predetermined times of the day associated with higher network activity levels.

Embodiments of the present invention may be implemented according to any of process flowcharts 200, 300, and 400, described above. Further, embodiments may implement both variations represented by step 302 of FIG. 3 and step 406 of FIG. 4. As such, the node implementing power-save will be less aggressive on both beacon sending and CTS-to-self transmission.

Further variations and/or optimizations according to embodiments of the present invention will now be described. However, embodiments of the present invention are not limited to the embodiments described herein. As would be understood by a person skilled in the art based on the teachings herein, other variations of the herein described methods may exist, and such variations would be within the scope of embodiments of the present invention.

According to an embodiment, the power-save methods described herein are not only triggered by the detection of low network activity or inactivity. For example, additionally or alternatively, power-save may be triggered based on the battery level of the node, time of the day, and/or statistically generated traffic information. Thus, a different power-save trigger condition than explicitly described above can be used.

According to another embodiment, the power-save methods described herein may be implemented such that a node implementing power-save would be permitted to enter sleep or low power method (i.e., perform CTS-to-self transmission) despite being the last beacon sender in the network. As such, new nodes wishing to join the network (when the node was the last beacon sender) will have to wait for the node to wake-up or for the next beacon interval to join the network. In an embodiment, such implementation may be used if the node has a priori information that no new nodes will be joining the network. Alternatively, a separate network discovery mechanism can be implemented so that network discovery is not adversely affected by the beaconing node entering sleep mode. As such, this embodiment may also be implemented on an access point (AP) in a BSS network.

According to another embodiment, the power-save methods described herein may be implemented such that CTS-to-self transmissions are performed at lower power than other transmissions over the shared medium. As such, only nodes within a smaller wireless range from the node implementing power-save will hear the CTS-to-self transmission and cease from using the channel. Nodes that are farther away will still be able to communicate, albeit not with the node itself. Accordingly, CTS-to-self transmissions would only have a localized effect on the network.

According to another embodiment, the power-save methods described herein may be implemented such that a node implementing power-save will enter sleep or low power mode despite determining that the shared medium is busy at the time of a scheduled CTS-to-self transmission. For example, referring to FIG. 2, if the node determines at step 214 that the shared medium is busy, instead of attempting to reschedule the CTS-to-self transmission, the node will cancel the CTS-to-self transmission and enter sleep or low power mode if it determines that the frame using the shared medium is not destined to it. In an embodiment, this includes examining the PLCP (Physical Layer Convergence Procedure) header and the MAC header of the frame to determine the frame destination and the transmission duration of the frame. Then, if the frame is not destined to the node, the node may determine the radio components to shut down depending on the transmission duration indicated in the PLCP header of the frame. For example, depending on frame duration, the node may determine to turn off its radio, oscillator, and PLL; to turn off its radio only (oscillator and PLL continue to be powered on); or to maintain all radio components on.

Figure 5:
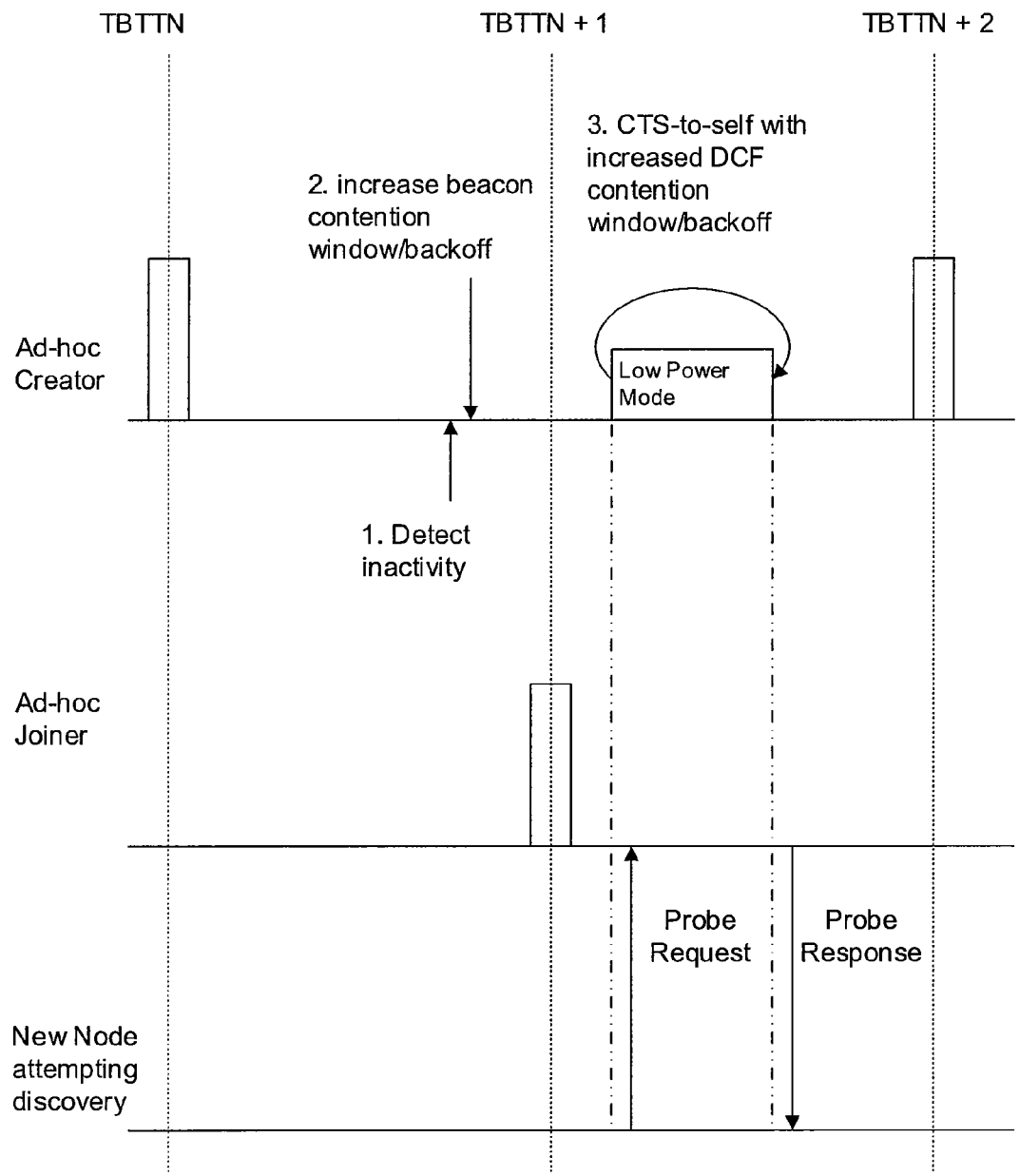
FIG. 5 is an example diagram which illustrates the operation of a power-save method according to an embodiment of the present invention.

FIG. 5 is an example diagram 500 which illustrates the operation of a power-save method according to an embodiment of the present invention. For simplification, it is assumed in the example of FIG. 5 that the IBSS network creator (referred to as ad-hoc creator in FIG. 5) is implementing a power-save method according to an embodiment of the present invention. It is further assumed that the ad-hoc creator node implements a power-save method with less aggressive beacon sending and CTS-to-self transmission as described above.

As shown in FIG. 1, at TBTT N, the ad-hoc creator node performs beacon transmission for the network. According to the embodiment illustrated in FIG. 5, the ad-hoc creator node is not permitted to enter sleep or low power during the beacon interval following its sending of a beacon. Thus, the ad-hoc creator node will remain awake for the beacon interval following TBTT N. However, at time "1." during this beacon interval, the ad-hoc creator node detects network inactivity (or a low level of network activity). In the embodiment illustrated in FIG. 5, this triggers the power-save feature at the ad-hoc creator node. Accordingly, at time "2." the ad-hoc creator begins by increasing the beacon DCF contention window size and/or the beacon DCF backoff. As described with respect to FIG. 3 above, this step lowers the probability that the ad-hoc creator node sends a beacon at TBTT N+1 or subsequently, thus increasing the probability that the ad-hoc creator node enters sleep or low power mode. Then, the ad-hoc creator node will schedule a CTS-to-self transmission to occur at the end of a random CTS-to-self transmission backoff time. In the embodiment illustrated in FIG. 5, the ad-hoc creator node implements an increased DCF contention window/backoff time for CTS-to-self transmissions.

At time TBTT N+1, the ad-hoc creator nodes does not perform beacon transmission for the network. Instead, beacon transmission is performed by an ad-hoc joiner node. As such, the ad-hoc creator node may enter sleep or low power mode during the beacon interval following TBTT N+1.

At time "3." during the beacon interval following TBTT N+1, the CTS-to-self transmission backoff time ends. Further, the ad-hoc creator determines that the shared medium is not busy. The ad-hoc creator node thus transmits a CTS packet at time "3.", indicating in the NAV field of the CTS packet the amount of time that the shared medium will be unavailable following the CTS packet transmission.

Immediately following a successful CTS-to-self transmission, the ad-hoc creator node enters sleep or low power mode for the NAV field duration indicated in the CTS packet. During this time, member nodes of the network will not attempt to use the shared medium. However, new nodes trying to join the network, if any, may send probe requests for network discovery during this time, as shown in FIG. 5, for example. In an embodiment, such probe requests may not be answered until the end of the sleep or low power mode period of the ad-hoc creator node. In FIG. 5, for example, when a new node attempting discovery sends a probe request during the sleep mode period, the ad-hoc joiner node (which is responsible for responding to probe requests during the beacon interval following TBTT N+1) only responds to the probe request after the end of the sleep or low power period.

At the end of the sleep or low power period, the ad-hoc creator node wakes up by powering back up its radio components that were shut down during the sleep or low power mode period. Subsequently, the ad-hoc creator will again contend for beacon transmission at time TBTT N+2, and in the example of FIG. 5 performs beacon transmission at time TBTT N+2.

Embodiments of the present invention may be implemented using hardware, software, or a combination thereof and may be implemented in one or more computer systems or other processing systems.

Figure 6:
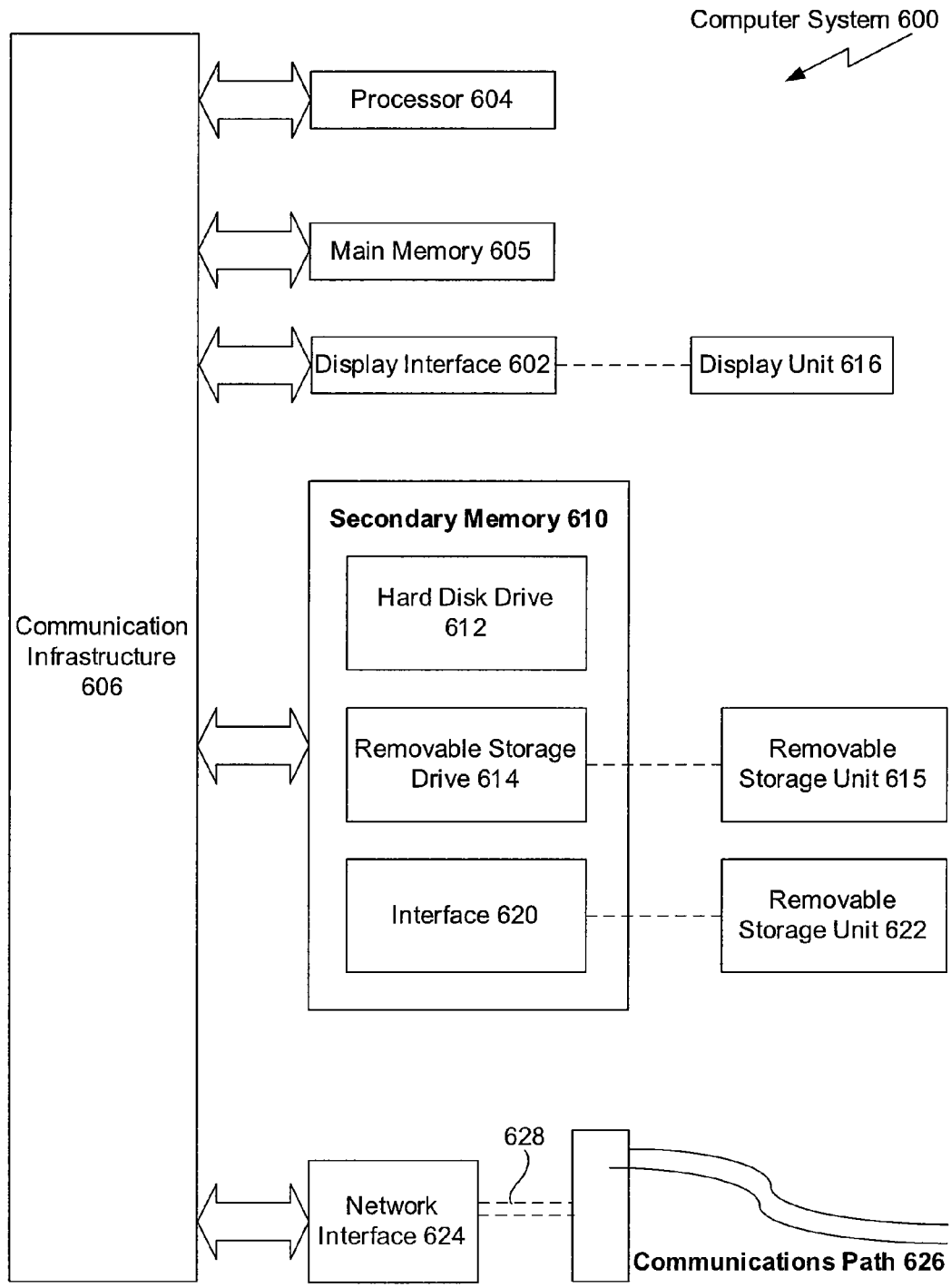
FIG. 6 is an example computer system useful for implementing components of the present invention.

An example computer system 600 useful for implementing components of embodiments of the present invention is shown in FIG. 6.

Computer system 600 includes one or more processors, such as processor 604. Processor 604 is connected to a communication infrastructure 606 (e.g., a communications bus, cross over bar, or network). Various software embodiments are described in terms of this exemplary computer system. After reading this description, it will become apparent to a person skilled in the relevant art(s) how to implement embodiments of the present invention using other computer systems and/or architectures.

Computer system 600 can include a display interface 602 that forwards graphics, text, and other data from communication infrastructure 606 (or from a frame buffer not shown) for display on display unit 616.

Computer system 600 also includes a main memory 605, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 615 in a well known manner. Removable storage unit 615 represents a floppy disk, magnetic tape, optical disk, etc. which is read by and written to by removable storage drive 614. As will be appreciated, removable storage unit 615 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 615 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 615 and interfaces 620, which allow software and data to be transferred from removable storage unit 615 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 614 and a hard disk installed in hard disk drive 612. These computer program products provide software to computer system 600.

Computer programs (also referred to as computer control logic or computer program logic) are stored in main memory 605 and/or secondary memory 610. Computer programs may also be received via communications interface 624. Such computer programs, when executed, enable or cause computer system 600 to perform the features of embodiments of the present invention, as discussed herein. In particular, the computer programs, when executed, enable or cause processor 604 to perform the features of embodiments of the present invention. Accordingly, such computer programs represent controllers of computer system 600.

In an embodiment where the present invention is implemented using software, the software may be stored in a computer program product and loaded into computer system 600 using removable storage drive 614, hard drive 612 or communications interface 624. The control logic (software), when executed by processor 604, causes processor 604 to perform the functions of the invention as described herein.

In another embodiment, embodiments of the present invention are implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, etc. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A power-save method implemented at a node in a wireless network having a shared communication medium, comprising:
    (a) determining whether a power-save trigger condition is satisfied, wherein the power-save trigger condition is a condition that, when satisfied, triggers entering a low power mode;
    (b) if the power-save trigger condition is satisfied, scheduling a CTS-to-self at a backoff time, wherein a destination address of the CTS-to-self matches an address of the node;
    (c) broadcasting the CTS-to-self at the backoff time; and
    (d) entering the low power mode following successful broadcast of the CTS-to-self.

2. The power-save method of claim 1, wherein step (a) comprises determining whether a low level of network activity has been detected over the shared communication medium.

3. The power-save method of claim 1, wherein step (a) comprises one or more of:
    determining whether a battery level at the node has dropped below a pre-determined battery level; and
    determining whether a time of the day condition is satisfied.

4. The power-save method of claim 1, wherein the backoff time is calculated according to a uniform probability distribution function from the range [0, CW], where CW indicates a pre-determined contention window length.

5. The power-save method of claim 1, wherein the broadcast CTS-to-self indicates an idle time duration following the broadcasting, and wherein the idle time duration is set such that the idle time duration does not straddle a scheduled beacon transmission required for network maintenance.

6. The power-save method of claim 1, further comprising immediately before step (c):
    (e) determining if the node is the last broadcasting node of a network maintenance beacon; and
    (f) if the node is the last broadcasting node of the network maintenance beacon, omitting steps (c) and (d);
    wherein the network maintenance beacon is broadcast periodically by a random one of nodes in the network.

7. The power-save method of claim 1, further comprising immediately before step (c):
    (e) determining if the shared communication medium is busy; and
    (f) if the shared communication medium is busy, omitting steps (c) and (d) and returning to step (b).

8. The power-save method of claim 1, further comprising immediately before step (c):
    (e) determining if the shared communication medium is busy;
    (f) if the shared communication medium is busy, determining whether a current frame being transmitted over the shared communication medium is destined to the node;
    (g) if the current frame being transmitted over the shared communication medium is not destined to the node, omitting steps (c) and (d); and
    (h) entering the low power mode for at least a remaining transmission time of the current frame.

9. The power-save method of claim 1, wherein step (d) comprises turning off a radio transceiver of the node for an idle time duration.

10. The power-save method of claim 1, wherein step (c) comprises broadcasting the CTS-to-self at lower power than other transmissions over the shared communication medium.

11. The power-save method of claim 1, wherein the broadcast CTS-to-self indicates an idle time duration following the broadcasting, and wherein the idle time is indicated in a network allocation vector (NAV) field of the CTS-to-self.

12. The power-save method of claim 1, wherein the wireless network includes an Independent Basic Service Set (IBSS) network.

13. The power-save method of claim 1, wherein the wireless network includes a Basic Service Set (BSS) network.

14. The power-save method of claim 1, wherein the node includes a cellular phone.

15. The power-save method of claim 2, wherein step (a) further comprises:
    monitoring network activity over a pre-determined number of consecutive beacon periods;
    generating a measure of network activity over the shared communication medium; and
    comparing the measure of network activity to a statistically generated measure of typical network activity of the shared communication medium.

16. The power-save method of claim 6, wherein the network maintenance beacon is broadcast by the node when a beacon broadcast backoff time calculated by the node is minimum compared to beacon broadcast backoff times calculated respectively by other nodes in the wireless network, and wherein the beacon broadcast backoff time is calculated according to a uniform probability distribution function from the range [0, $CW_{beacon}$], where $CW_{beacon}$ indicates a pre-determined contention window length for beacon broadcast.

17. The power-save method of claim 8, wherein step (h) comprises, depending on the remaining transmission time of the current frame, one of:
    turning off a radio transceiver, an oscillator, and a phase-locked loop (PLL) of the node;
    turning off only the radio transceiver of the node; and
    maintaining all radio components of the node turned on.

18. The power-save method of claim 16, further comprising:
   increasing at least one of the beacon broadcast backoff time and the pre-determined contention window length for beacon broadcast, thereby decreasing a probability that the node will be the last broadcasting node of the network maintenance beacon in step (f).

19. The power-save method of claim 18, wherein the backoff time is calculated according to a uniform probability distribution function from the range [0, CW], where CW indicates a pre-determined contention window length, further comprising:
   increasing at least one of the backoff time and the pre-determined contention window length, thereby increasing a probability that the shared communication medium will be busy at the random backoff time in step (f).

20. A computer program product comprising a non-transitory computer useable medium having computer program logic recorded thereon for causing a processor to implement a power-save method at a node in a wireless network having a shared communication medium, the power-save method comprising:
   determining whether a power-save trigger condition is satisfied, wherein the power-save trigger condition is a condition that, when satisfied, triggers entering a low power mode;
   scheduling a CTS-to-self at a backoff time when the power-save trigger condition is satisfied, wherein a destination address of the CTS-to-self matches an address of the node;
   broadcasting the CTS-to-self at the backoff time; and
   entering the low power mode following successful broadcast of the packet.

21. The computer program product of claim 20, wherein determining whether the power-save condition is satisfied comprises determining whether a low level of network activity has been detected over the shared communication medium.

22. The computer program product of claim 20, wherein the power-save method further comprises:
   determining if the node is the last broadcasting node of a network maintenance beacon; and
   cancelling the scheduled CTS-to-self if the node is the last broadcasting node of the network maintenance beacon, wherein the network maintenance beacon is broadcast periodically by a random one of nodes in the network.

23. The computer program product of claim 22, wherein the network maintenance beacon is broadcast by the node when a beacon broadcast backoff time calculated by the node is minimum compared to beacon broadcast backoff times calculated respectively by other nodes in the wireless network, and wherein the beacon broadcast backoff time is calculated according to a uniform probability distribution function from the range [0, $CW_{beacon}$], where $CW_{beacon}$ indicates a pre-determined contention window length for beacon broadcast.

24. The computer program product of claim 20, wherein the power-save method further comprises:
   determining if the shared communication medium is busy; and
   cancelling the scheduled CTS-to-self if the shared communication medium is busy.

25. The computer program product of claim 20, wherein the power-save method further comprises:
   determining if the shared communication medium is busy;
   if the shared communication medium is busy, determining whether a current frame being transmitted over the shared communication medium is destined to the node;
   cancelling the scheduled CTS-to-self if the current frame being transmitted over the shared communication medium is not destined to the node; and
   entering the low power mode for at least a remaining transmission time of the current frame.

26. The computer program product of claim 20, wherein the power-save method further comprises:
   turning off at least one of a radio transceiver, an oscillator, and a phase-locked loop (PLL) of the node.

27. The computer program product of claim 23, wherein the power-save method further comprises:
   increasing at least one of the beacon broadcast backoff time and the pre-determined contention window length for beacon broadcast, thereby decreasing a probability that the node will be the last broadcasting node of the network maintenance beacon.

28. The computer program product of claim 24, wherein the backoff time is calculated according to a uniform probability distribution function from the range [0, CW], where CW indicates a pre-determined contention window length, wherein the power-save method further comprises:
   increasing at least one of the backoff time and the pre-determined contention window length, thereby increasing a probability that the shared communication medium will be busy at the backoff time.

* * * * *

UNITED STATES PATENT AND TRADEMARK OFFICE
CERTIFICATE OF CORRECTION

| | | |
|---|---|---|
| PATENT NO. | : 8,934,386 B2 | Page 1 of 1 |
| APPLICATION NO. | : 12/642253 | |
| DATED | : January 13, 2015 | |
| INVENTOR(S) | : Mahesh Iyer et al. | |

It is certified that error appears in the above-identified patent and that said Letters Patent is hereby corrected as shown below:

In the Claims

Column 10, line 34, please replace "time is" with --time duration is--.

Signed and Sealed this
Twenty-eighth Day of April, 2015

Michelle K. Lee
*Director of the United States Patent and Trademark Office*